US011436087B2

(12) United States Patent
Bishnoi et al.

(10) Patent No.: US 11,436,087 B2
(45) Date of Patent: Sep. 6, 2022

(54) SYSTEMS AND METHODS FOR IMPLEMENTING AND MANAGING PERSISTENT MEMORY

(71) Applicant: Everspin Technologies, Inc., Chandler, AZ (US)

(72) Inventors: Pankaj Bishnoi, Austin, TX (US); Trevor Sydney Smith, Austin, TX (US); James MacDonald, Buda, TX (US)

(73) Assignee: Everspin Technologies, Inc., Chandler, AZ (US)

( * ) Notice: Subject to any disclaimer, the term of this patent is extended or adjusted under 35 U.S.C. 154(b) by 0 days.

(21) Appl. No.: 15/993,046

(22) Filed: May 30, 2018

(65) Prior Publication Data

US 2018/0349225 A1 Dec. 6, 2018

Related U.S. Application Data

(60) Provisional application No. 62/539,005, filed on Jul. 31, 2017, provisional application No. 62/512,934, filed on May 31, 2017.

(51) Int. Cl.
*G06F 11/00* (2006.01)
*G06F 11/14* (2006.01)
(Continued)

(52) U.S. Cl.
CPC ........... *G06F 11/1441* (2013.01); *G06F 1/30* (2013.01); *G06F 1/305* (2013.01); *G06F 3/0619* (2013.01); *G06F 12/0246* (2013.01)

(58) Field of Classification Search
CPC ........... G06F 2212/205; G06F 11/1461; G06F 11/1471; G06F 11/165; G06F 12/0868;
(Continued)

(56) References Cited

U.S. PATENT DOCUMENTS 6,527,721 B1 * 3/2003 Wittrock .................. A61B 8/00
600/446
8,656,255 B1 * 2/2014 Nemazie ............. G06F 11/1008
714/763
(Continued)

OTHER PUBLICATIONS

Andrew J. Walker, "Unleashing MRAM as Persistent Memory," Presentation, SNIA Persistent Memory Summit, Jan. 24, 2018, 13 pp., San Jose, CA.
(Continued)

*Primary Examiner* — Loan L. T. Truong
(74) *Attorney, Agent, or Firm* — Bookoff McAndrews, PLLC

(57) ABSTRACT

The present disclosure is drawn to, among other things, a method of managing a memory device. In some aspects, the method includes receiving data to be stored in a storage memory, wherein the storage memory is coupled to the memory device, wherein the memory device includes a first memory type and a second memory type different from the first memory type; storing a first copy of the received data in the first memory type; storing a second copy of the received data in the second memory type; receiving indication of a power loss to the memory device; in response to receiving indication of the power loss, copying the second copy from the second memory type to the storage memory; detecting for power restoration to the memory device after the power loss; and in response to detecting power restoration to the memory device, restoring data to the first memory type by copying data from the second memory type to the first memory type.

17 Claims, 11 Drawing Sheets

(51) Int. Cl.
G06F 1/30 (2006.01)
G06F 3/06 (2006.01)
G06F 12/02 (2006.01)

(58) Field of Classification Search
CPC ........... G06F 2212/1032; G06F 9/4418; G06F 9/461; G06F 11/1441; G06F 1/30; G06F 11/1451; G06F 1/305; G06F 3/0619; G06F 12/0246; G05B 2219/24137; G05B 2219/2413
See application file for complete search history.

(56) References Cited

U.S. PATENT DOCUMENTS

| | | | | |
|---|---|---|---|---|
| 9,304,703 | B1* | 4/2016 | Ignomirello | H03M 7/55 |
| 9,436,563 | B2* | 9/2016 | Chinnakkonda Vidyapoornachary | G06F 11/1666 |
| 9,767,017 | B2* | 9/2017 | Talagala | G06F 12/0246 |
| 10,528,264 | B2* | 1/2020 | Kim | G06F 3/0619 |
| 2002/0156946 | A1* | 10/2002 | Masters | G06F 3/0656 710/33 |
| 2003/0126494 | A1* | 7/2003 | Strasser | G06F 11/1441 714/6.2 |
| 2003/0225955 | A1* | 12/2003 | Feldstein | H04M 11/066 710/306 |
| 2004/0103238 | A1* | 5/2004 | Avraham | G06F 11/1441 711/102 |
| 2006/0139069 | A1* | 6/2006 | Frank | G06F 1/30 327/143 |
| 2007/0282967 | A1* | 12/2007 | Fineberg | G06F 11/1641 709/214 |
| 2008/0195807 | A1* | 8/2008 | Kubo | G06F 12/126 711/114 |
| 2009/0113220 | A1* | 4/2009 | Lee | G06F 21/81 713/193 |
| 2009/0292887 | A1* | 11/2009 | Manczak | G06F 1/30 711/162 |
| 2010/0016066 | A1* | 1/2010 | Shimabukuro | G07F 17/32 463/25 |
| 2010/0077188 | A1* | 3/2010 | Graham | G06F 1/30 712/244 |
| 2010/0080057 | A1* | 4/2010 | Reuter | G11C 5/141 365/185.04 |
| 2011/0202728 | A1* | 8/2011 | Nichols | G06F 11/1441 711/141 |
| 2012/0089854 | A1* | 4/2012 | Breakstone | G06F 1/30 713/323 |
| 2012/0293002 | A1* | 11/2012 | Ye | H02J 9/06 307/66 |
| 2013/0229880 | A1* | 9/2013 | Sartore | G11C 14/0018 365/189.07 |
| 2014/0365715 | A1* | 12/2014 | Lee | G06F 12/0246 711/103 |
| 2016/0041758 | A1* | 2/2016 | Iwasaki | G06F 3/0665 711/103 |
| 2016/0092223 | A1* | 3/2016 | Wang | G06F 9/3004 712/208 |
| 2016/0139982 | A1* | 5/2016 | Yu | G06F 16/172 714/768 |
| 2016/0342487 | A1* | 11/2016 | Ware | G11C 7/20 |
| 2017/0010644 | A1* | 1/2017 | Khessib | G06F 1/263 |
| 2017/0060297 | A1* | 3/2017 | Berke | G06F 3/0619 |
| 2017/0075781 | A1* | 3/2017 | Bennett, Jr. | G06F 3/0619 |
| 2017/0149925 | A1* | 5/2017 | Yang | H04L 67/2852 |
| 2017/0220295 | A1* | 8/2017 | Khan | G06F 3/0608 |
| 2017/0228154 | A1* | 8/2017 | Liu | G06F 11/1441 |
| 2017/0286285 | A1* | 10/2017 | Berke | G06F 12/0868 |
| 2017/0315889 | A1* | 11/2017 | Delaney | G06F 1/30 |
| 2017/0351545 | A1* | 12/2017 | Burke | G06F 9/505 |
| 2017/0357301 | A1* | 12/2017 | Chen | G06F 11/1441 |
| 2018/0060098 | A1* | 3/2018 | Atia | G06F 9/45558 |
| 2018/0089088 | A1* | 3/2018 | Jakowski | G06F 12/0607 |
| 2018/0137052 | A1* | 5/2018 | Boyle | G06F 12/0804 |
| 2018/0241818 | A1* | 8/2018 | Baptist | H04L 67/1097 |
| 2018/0275902 | A1* | 9/2018 | Monday | G06F 11/3055 |
| 2018/0329818 | A1* | 11/2018 | Cheng | G06F 11/1471 |
| 2018/0349225 | A1* | 12/2018 | Bishnoi | G06F 1/30 |
| 2018/0364928 | A1* | 12/2018 | Park | G06F 1/30 |
| 2019/0073132 | A1* | 3/2019 | Zhou | G06F 3/0608 |
| 2019/0107950 | A1* | 4/2019 | Sankaranarayanan | G06F 3/065 |
| 2019/0171580 | A1* | 6/2019 | Suryanarayana | G06F 12/1036 |
| 2019/0243723 | A1* | 8/2019 | Van Sickle | G06F 11/1464 |
| 2019/0280520 | A1* | 9/2019 | Zhang | H02J 9/062 |
| 2020/0233474 | A1* | 7/2020 | Alcorn | G11C 16/32 |

OTHER PUBLICATIONS

Mark Kyrnin "What is the M.2 Solid State Drive Interface?" updated on Oct. 5, 2016, (22 pages), current version of webpage available at: https://www.lifewire.com/what-is-m2-833453 ; version of webpage as of Oct. 5, 2016 available at: https://web.archive.org/web/20161130193653/https://www.lifewire.com/what-is-m2-833453.

Chris Mellor "Say hello to Samsung and Netlist's flash-DRAM grenade: HybriDIMM" Aug. 8, 2016, (13 pages), available at: https://www.theregister.com/2016/08/08/samsung_and_netlist_hybridimm/.

Bill Gervasi "NVDIMM-P A New Hybrid Architecture" Discobolus Designs Apr. 14, 2016, (14 pages), available at: http://www.discobolusdesigns.com/personal/20160414_gervasi_NVDIMM-P.pdf.

JEDEC Standard "DDR4 NVDIMM-N Design Standard (Revision 1.0)" Sep. 2016, JEDEC Solid State Technology Association (47 pages).

Stephen Bates, PhD "Enabling Remote Access to Persistent Memory on an IO Subsystem using NVM Express and RDMA" Storage Developer Conference, Santa Clara, 2016, (27 pages), available at: https://www.snia.org/sites/default/files/SDC/2016/presentations/persistent_memory/Stephen_Bates_Enabling_Remote_Access_Persistent_Memory_IO_Subsystem_using_NVM_Express_RDMA.pdf.

* cited by examiner

SYSTEMS AND METHODS FOR IMPLEMENTING AND MANAGING PERSISTENT MEMORY

CROSS-REFERENCE TO RELATED APPLICATIONS

This application claims the benefit of priority from U.S. Provisional Application No. 62/512,934, filed on May 31, 2017, and from U.S. Provisional Application No. 62/539,005, filed on Jul. 31, 2017, each of which are incorporated by reference herein in their entirety.

TECHNICAL FIELD

Embodiments of the present disclosure relate to, among other things, implementing, allocating, and/or configuring persistent memory.

INTRODUCTION

In general, memory used to store data in a computing system can be volatile (to store volatile information) or non-volatile (to store persistent information). Volatile data structures stored in volatile memory generally are used for temporary or intermediate information that is required to support the functionality of a program during the run-time of the program. Persistent data structures stored in non-volatile (or persistent) memory generally are available beyond the run-time of a program and can be accessed even if power to the memory or computing system is interrupted. Volatile data structures generally are stored in volatile main memory and may be directly accessible by a processor. Persistent data structures generally are stored on non-volatile storage devices such as, e.g., rotating disks or non-volatile memory-based devices, e.g., flash memory.

Some volatile memory such as, e.g., dynamic random-access memory (DRAM) are manufactured as part of dual in-line memory modules (DIMMs), which are small modules that include a set of DRAM chips that are used together as a part of a memory system. Because volatile memory such as, e.g., DRAM, loses stored data when power is interrupted, some critical runtime applications rely on back-up power (e.g., backup batteries or supercapacitors) to sustain power to the DIMMs. The back-up power generally may sustain a DIMM for up to a specified amount of time based on battery capacity and battery charge.

BRIEF DESCRIPTION OF THE DRAWINGS

In the course of the detailed description that follows, reference will be made to the appended drawings. The drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein; however, all permutations and combinations are considered to fall within the scope of the present inventions.

Figure 1:
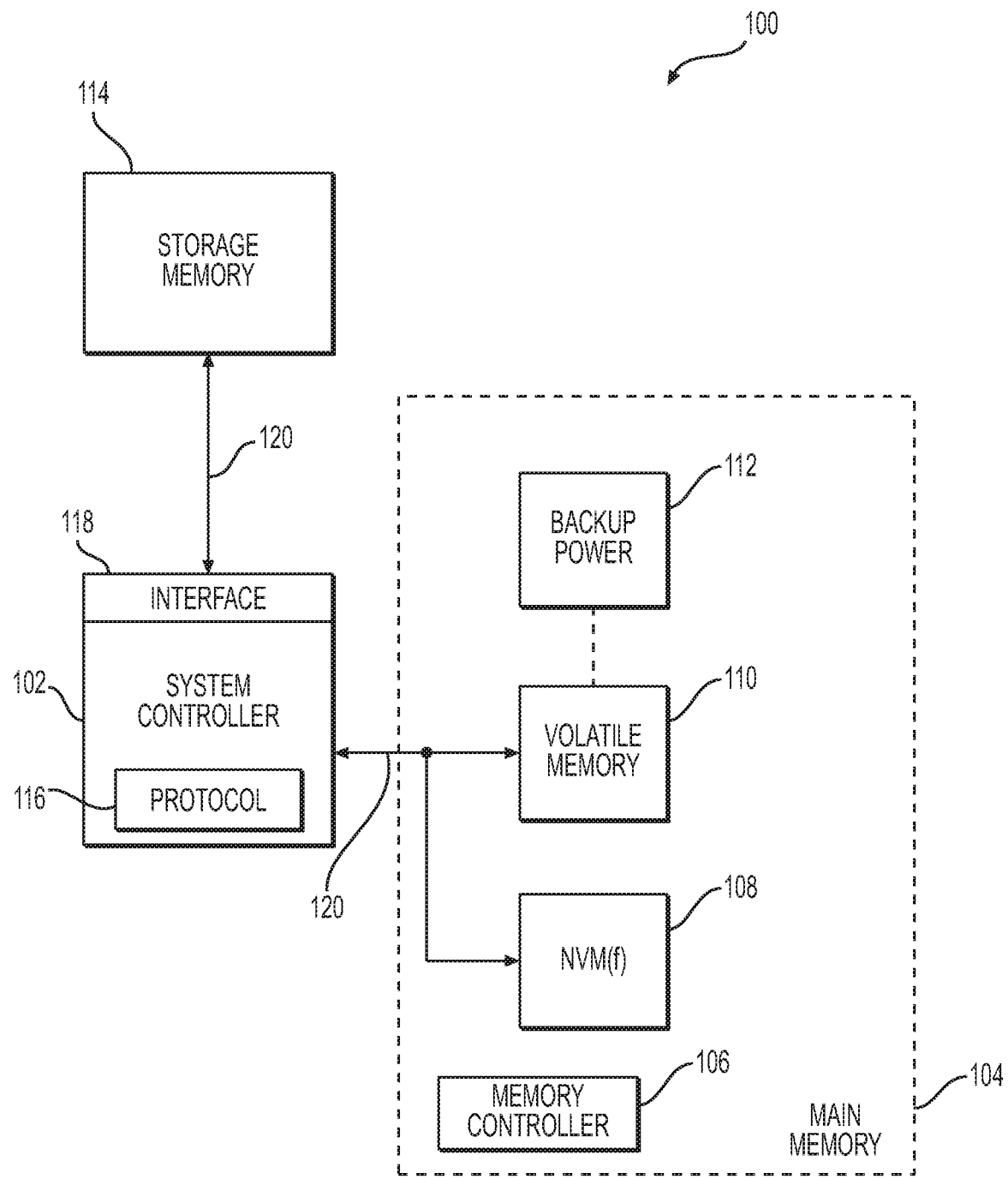
FIG. 1 depicts a block diagram of select components of an exemplary computing system, according to one aspect of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

DETAILED DESCRIPTION

Detailed illustrative aspects are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of exemplary embodiments described herein.

When the specification makes reference to "one embodiment" or to "an embodiment," it is intended to mean that a particular feature, structure, characteristic, or function described in connection with the embodiment being discussed is included in at least one contemplated embodiment of the present disclosure. Thus, the appearance of the phrases, "in one embodiment" or "in an embodiment," in different places in the specification does not constitute a plurality of references to a single embodiment of the present disclosure.

As used herein, the singular forms "a," "an," and "the" are intended to include the plural forms as well, unless the context clearly indicates otherwise. It also should be noted that in some alternative implementations, the features and/or steps described may occur out of the order depicted in the figures or discussed herein. For example, two steps or figures shown in succession may instead be executed substantially concurrently or may sometimes be executed in the reverse order, depending upon the functionality/acts involved. In some aspects, one or more described features or steps may be omitted altogether, or may be performed with an intermediate step therebetween, without departing from the scope of the embodiments described herein, depending upon the functionality/acts involved.

Non-Volatile Persistence in Multi-Tiered Memory Systems

In one aspect, the present disclosure is directed to techniques and implementations for non-volatile persistence in a multi-tiered memory system including two or more memory technologies for volatile memory and/or non-volatile memory.

Turning to FIG. 1, there is depicted a computing system 100 according to one embodiment of the present disclosure. Computing system 100 may include a system controller 102, a main memory 104, and a storage memory 114 (e.g., a data storage device in the form of a drive unit, which may include fixed or removable computer-readable storage medium), one or more of which communicate with other components of computing system 100 via a bus 120. The main memory 104 may include a memory controller 106, a non-volatile memory 108, a volatile memory 110, and an optional back-up power supply 112. In some embodiments, the memory controller 106 may manage the flow of data going to and from main memory 104. Memory controller 106 may be a separate integrated circuit, but may also be implemented on the die of a microprocessor.

System controller 102 may be a centralized unit or a distributed controller, representing one or more general-purpose processing devices such as a microprocessor or central processing unit. More particularly, the system controller 102 may be a complex-instruction-set-computing (CISC) microprocessor, reduced-instruction-set-computing (RISC) microprocessor, processor implementing other instruction sets, or processors implementing a combination of instruction sets. System controller 102 may also be one or more special-purpose processing devices such as an application-specific integrated circuit (ASIC), a field programmable gate array (FPGA), a digital signal processor (DSP), or network processor.

System controller 102 may comprise any suitable physical interface 118 (e.g., physical component interconnect express (PCIe), serial advanced technology attachment (SATA), serial attached small computer system interface (SAS), etc.) for connecting a computer to one more peripheral devices. System controller 102 also may communicate to peripheral devices using any suitable command protocol 116 (e.g., non-volatile dual in-line memory module (NVDIMM-P), non-volatile memory express (NVMe), advanced host controller interface (AHCI), etc.).

In the embodiments described herein for computing system 100, two or more memory types may be used. For example, in one or more instances, computing system 100 may include a first memory type, such as, e.g., a volatile memory technology, and a second memory type, such as, e.g., a non-volatile memory (NVM) technology, as described below in greater detail. Volatile memory generally requires electrical power to maintain the stored information. Stated differently, volatile memory generally retains its contents while powered on but generally loses its contents when the power is interrupted. NVM devices, on the other hand, generally can retrieve stored information even after power is removed.

As alluded to above, the first memory type in computing system 100 may be a volatile memory 110, such as a volatile DRAM device. Other forms of volatile memory, however, are contemplated, such as, e.g., static random-access memory (SRAM), thyristor random-access memory (T-RAM), and zero-capacitor random-access memory (Z-RAM).

Both storage memory 114 and NVM(f) 108 ("NVM(f)" generally denoting a relatively faster NVM device) may be non-volatile memory (NVM) devices. Storage memory 114, however, may be a relatively slower-speed type of NVM device as compared to the relatively faster-speed type of NVM(f) 108. The speed of the memory, which can be measured in both latency (e.g., how long the memory requires to read or write a single unit of data in response to a request to do so) and throughput (e.g., how much data the memory can read or write over a certain period of time) generally determines the rate at which its data can be accessed and/or processed by a processor. With respect to synchronous memory, the higher the clock rating of the memory, the faster the system may be able to access (e.g., read and write) information from the memory.

In some embodiments, storage memory 114 may be a relatively slower-speed type of memory, such as, e.g., solid-state drives (SSDs), NAND flash, NOR flash, pseudo static RAM, erasable programmable read only memory (EPROM), electrically erasable programmable ROM (EEPROM), or hard disk drives (HDDs). NVM(f) 108, on the other hand, may be a relatively faster-speed type of memory, such as, e.g., resistive RAM (ReRAM), magnetoresistive RAM (MRAM), phase-change memory (PCM), and/or racetrack memory.

The multi-tiered memory scheme of computing system 100 leverages the various access rates for each of the memory types. Volatile devices, such as DRAM, can be accessed, for example, in a range of tens of nanoseconds (~10's nsec). By comparison, slower NVM devices, such as NAND flash devices, can be accessed for read operations, e.g., in a range in tens of microseconds (~10's μsec) and for write operations in hundreds of microseconds (~100's μsec). Faster NVM(f) devices, such as MRAM, can perform operations at, e.g., in a range of tens of nanoseconds (~10's nsec).

Turning back to FIG. 1, volatile memory 110 may be connected to back-up power supply 112 (e.g., battery pack or supercapacitor) permitting data stored in volatile memory 110 to be backed up to either NVM(f) 108, storage memory 114, or both, during a system power loss. Memory controller 106 may, for example, store an initial copy of data in the relatively faster, volatile memory 110 (e.g., DRAM), prior to storing in the persistent storage memory 114 (e.g., NAND Flash). In the event of a system power loss, data stored in volatile memory 110 may be lost prior to committing the data to storage memory 114. Rather than relying on back-up power supply 112 to power volatile memory 110, storing a copy of data in NVM(f) 108 (e.g., MRAM) may serve as a back-up copy in the event of system power loss. Simultaneously storing data in both volatile memory 110 and persistent NVM(f) 108 may thus reduce a system's vulnerability to data loss during a system power loss.

Figure 2A:
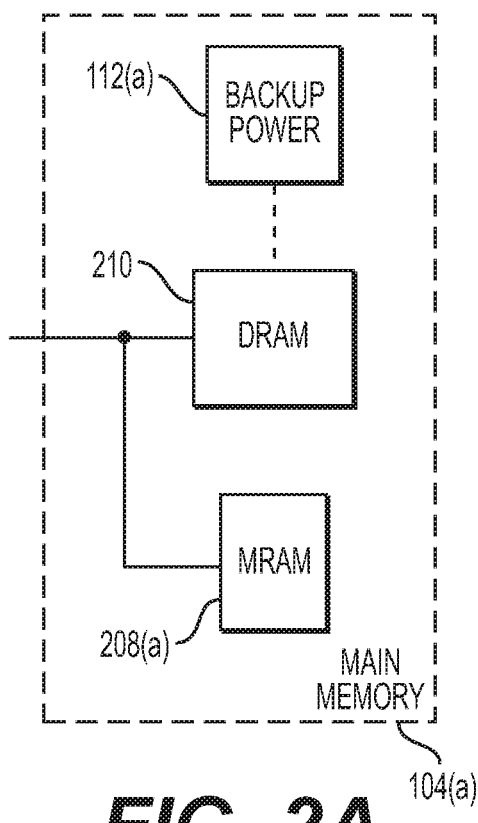
FIG. 2A depicts a block diagram of select components of an exemplary main memory configuration, according to one aspect of the present disclosure.
Figure 2B:
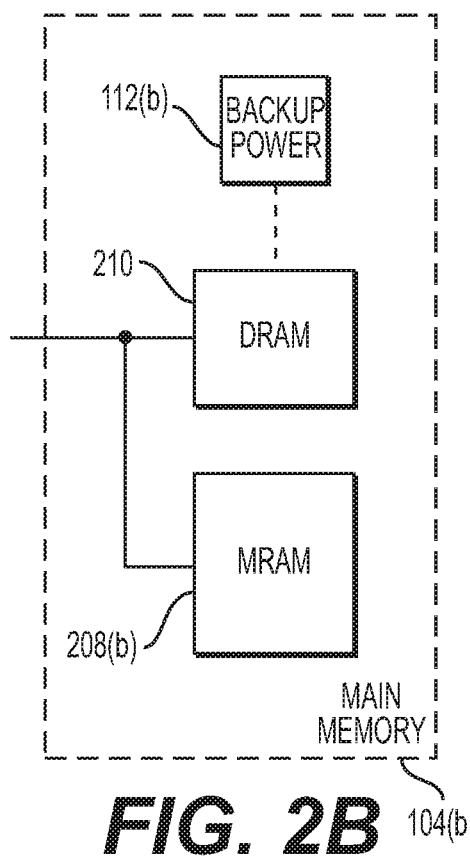
FIG. 2B depicts a block diagram of select components of another exemplary main memory configuration, according to one aspect of the present disclosure.
Figure 2C:
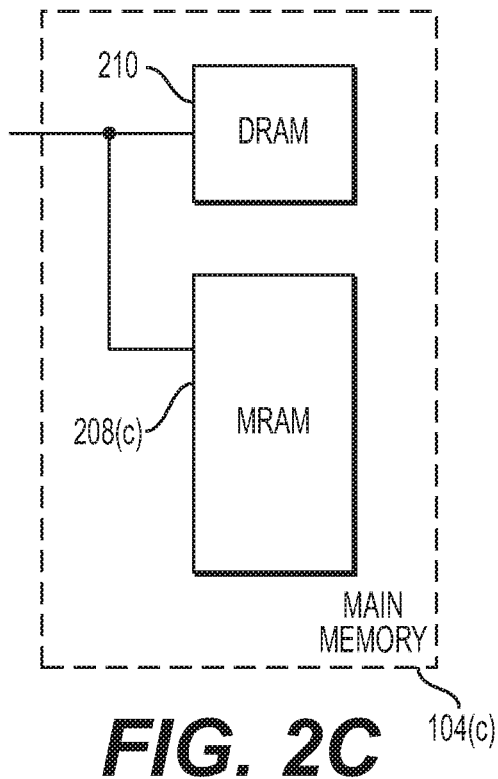
FIG. 2C depicts a block diagram of select components of yet another exemplary main memory configuration, according to one aspect of the present disclosure.

There may be instances, however, when the size of NVM(f) 108 may be limited in capacity and may not be able to capture a complete copy of what is stored in volatile memory 110. In these cases, providing a back-up power supply 112 to volatile memory 110 may permit vulnerable data to be transferred and stored in storage memory 114 prior to any data loss. It is to be appreciated, however, that with a higher-capacity NVM(f) 108, a smaller back-up power supply 112 may be needed, which can reduce system costs and the physical area needed to implement the system. FIGS. 2A-2C, described below, will depict various scenarios in which the size of back-up power may vary depending on the capacity of NVM(f) 108 devices.

Turning now to FIG. 2A, there is depicted a first exemplary scenario in which a main memory 104(a) includes a DRAM 210 (e.g., volatile memory), an MRAM 208(a) (e.g., a faster type of non-volatile memory), and a back-up power supply 112(a) (e.g., battery, supercapacitor). Because DRAM 210 is a type of volatile memory, it may lose all of its stored data when power is removed. During a power failure (or upon receiving an indication of impending power failure), for example, system controller 102 and/or memory controller 106 may rely on the stored energy of the back-up power supply 112(a) to copy vulnerable data stored in DRAM 210 to persistent memory (e.g., storage memory 114 as described above with reference to FIG. 1) to mitigate any losses or other corruption of data stored in DRAM 210. There may be some instances, however, when the size of the back-up power supply 112(a) and its limited amount of stored energy presents a risk that some vulnerable data may not get copied from the volatile memory to persistent memory in time to prevent data loss and/or data corruption. In other words, some vulnerable data may not get copied to persistent memory by the time the back-up power supply 112(a) loses its stored charge. Therefore, in one embodiment of the present disclosure, an MRAM 208(a) (e.g., a faster type of persistent, non-volatile memory) is provided as a safeguard measure to separately store a copy of vulnerable data stored in DRAM 210. Because MRAM 208(a) may have relatively faster access speeds, it may be able to quickly capture and store vulnerable data from DRAM 210 in time before the back-up power supply 112(a) loses all of its stored charge. It is to be appreciated that with a greater capacity of MRAM 208(a), less reliance may be placed on the back-up power supply 112(a) to store vulnerable data from DRAM 210 to persistent memory (e.g., storage memory 114 as shown in FIG. 1).

With reference now to FIG. 2B, there is depicted a second exemplary scenario in which a main memory 104(b) includes a DRAM 210, an MRAM 208(b), and a back-up power supply 112(b). In the second scenario, MRAM 208(b) may be configured to store a greater capacity of data as compared to the storage capacity of MRAM 208(a). For illustrative purposes, MRAM 208(b) is drawn larger than MRAM 208(b) to reflect that MRAM 208(a) has a greater storage capacity than MRAM 208(a). Because MRAM 208(b) has a greater storage capacity, less reliance is placed on the back-up power supply 112(b). With less reliance placed on the back-up power supply 112(b), a smaller back-up power supply 112(b) may be needed. For illustrative purposes, back-up power supply 112(b) is drawn smaller than back-up power supply 112(a) to reflect that back-up power supply 112(b) is smaller (and/or has less stored energy) than back-up power supply 112(a).

Turning now to FIG. 2C, there is depicted a third exemplary scenario in which a main memory 104(c) includes a DRAM 210 and an MRAM 208(c). In the third scenario, it is contemplated that MRAM 208(c) is configured with even greater storage capacity than that of MRAM 208(b). In this embodiment, MRAM 208(c) may be configured with greater storage capacity such that it may be able to separately capture and store all vulnerable data without relying on any back-up power to DRAM 210. As a result, main memory 104(c) does not include any back-up power.

Figure 3A:
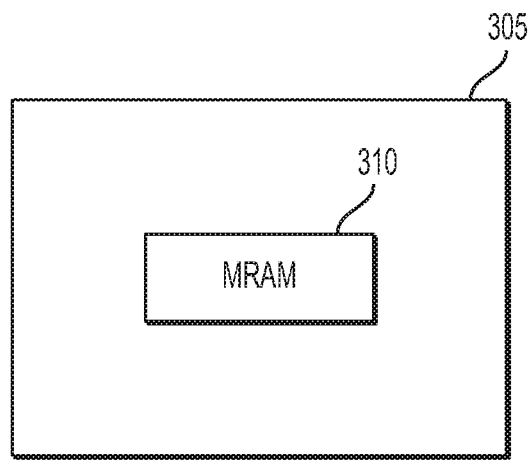
FIG. 3A depicts a block diagram of an exemplary discrete memory device, according to one aspect of the present disclosure.
Figure 3B:
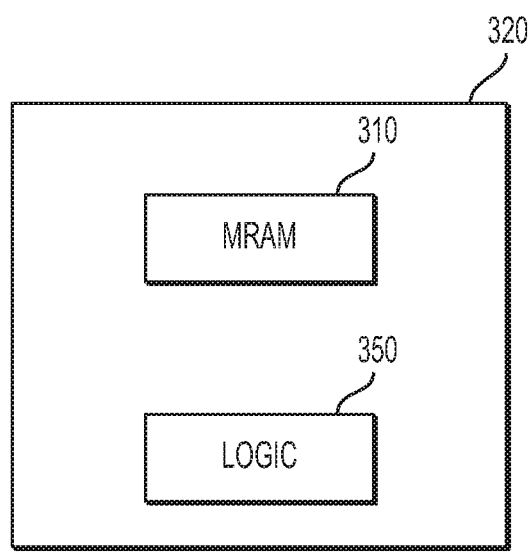
FIG. 3B depicts a block diagram of an exemplary embedded memory device, according to one aspect of the present disclosure.

The faster non-volatile memory such as, e.g., MRAM, may be utilized in both discrete and embedded applications. FIG. 3A, for example, depicts a discrete memory device 305 in which MRAM 310 serves as the non-volatile data storage component. As a discrete memory device, MRAM may be used as a replacement for SRAM, DRAM, and/or NOR-Flash due to its higher speed, lower latency, scalability, and relatively high endurance. FIG. 3B, on the other hand, depicts an embedded system 320 in which MRAM 310 is used as a non-volatile data storage. In some embodiments, embedded system 320 may include logic circuitry 350 as part of an integrated system, such as, e.g., SOC (system-on-chip), CPU (central processing unit), and GPU (graphics processing unit).

Non-Volatile Persistence in NVDIMMs

The use of persistent, non-volatile memory devices with higher access speeds, such as, e.g., MRAM, may be leveraged in other multi-tiered implementations that include both volatile and non-volatile memory. For example, some non-volatile dual in-line memory modules (NVDIMMs) may use DRAM technology (e.g., DDR3 DRAM) for storing data and use flash memory (e.g., NAND flash) to preserve all or a portion of the data stored in DRAM. In this instance, the NVDIMM may be a mixed memory subsystem that combines the speed and endurance of DRAM, together with the non-volatile data retention properties of flash memory. However, as discussed above with reference to FIGS. 1-2C, reliance on a back-up power supply generally may be required as a measure to preserve vulnerable data in volatile memory (e.g., DRAM) to non-volatile memory when power is lost, such as, e.g., in configurations where the capacity of the non-volatile component of the NVDIMM is insufficient to retain all of the data in volatile memory (e.g., DRAM).

Therefore, another aspect of the present disclosure is directed to techniques and implementations for using a multi-tiered memory scheme (e.g., three-tier memory type scheme) to leverage faster persistent memory and reduce a computer system's reliance on back-up power sources for backing up NVDIMMs.

Figure 4:
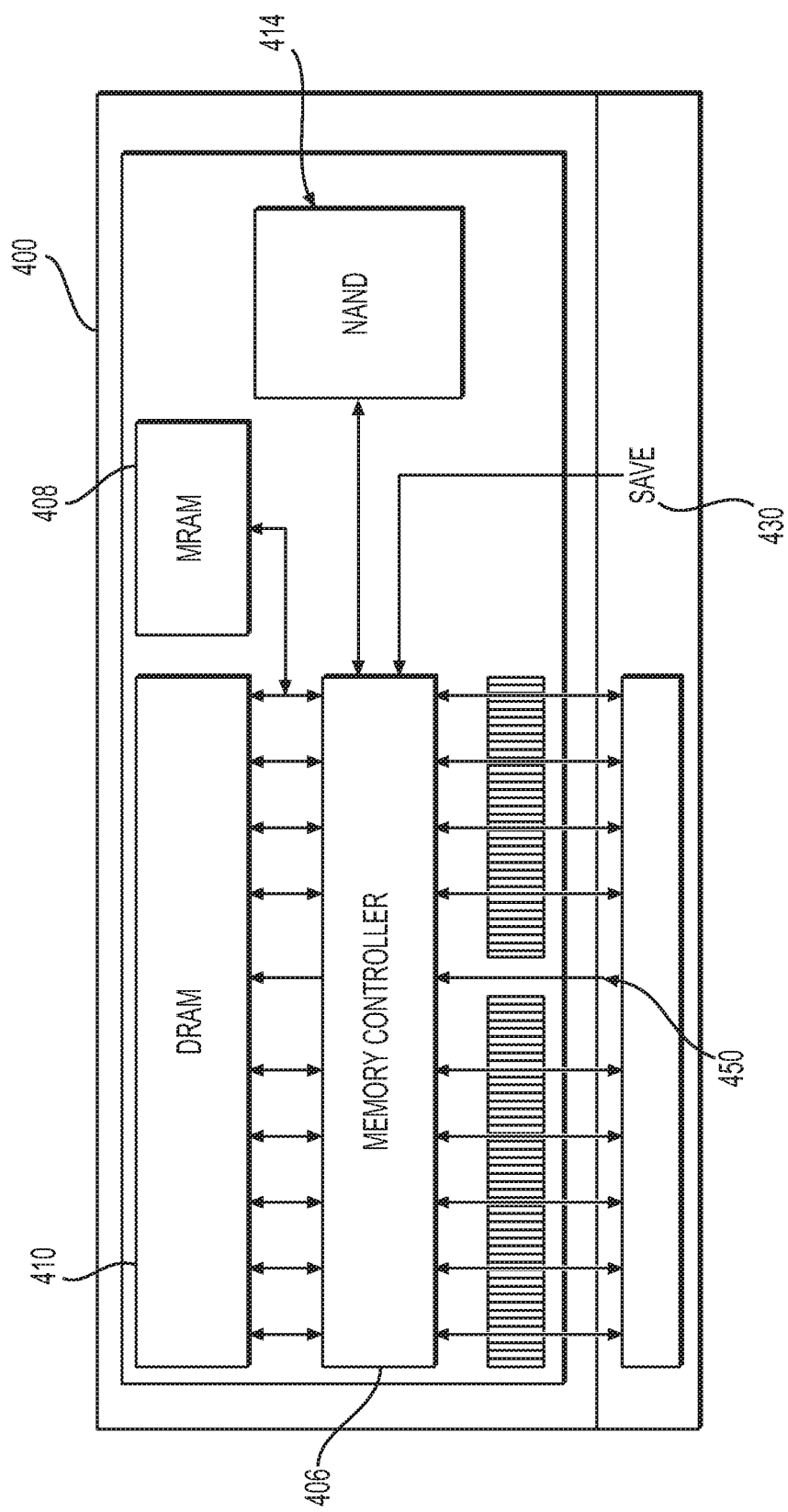
FIG. 4 depicts a block diagram of an exemplary NVDIMM device with embedded MRAM, according to another aspect of the present disclosure.

With reference now to FIG. 4, there is depicted an example embodiment of a non-volatile dual in-line memory module (NVDIMM) 400, in which a multi-tiered memory scheme includes a volatile memory and two types of non-volatile memory. NVDIMM 400, for example, may include a DRAM 410 (e.g., volatile memory), a NAND flash device 414 (e.g., slower speed non-volatile memory), and an MRAM 408 (e.g., faster speed non-volatile memory). In this embodiment, it is to be appreciated that NVDIMM 400 leverages a multi-tiered memory scheme and is configured with no back-up power. In this instance, the faster MRAM 408 is configured with sufficient capacity to separately store a copy of vulnerable data stored in DRAM 410. However, as discussed above with reference to FIGS. 2A-2C, a back-up power to DRAM 410 may be included in instances where MRAM 408 is configured with insufficient capacity to store all of the vulnerable data stored in DRAM 410. In other embodiments, the vulnerable data may be segregated between critical data that needs to be backed up and non-critical data that can be let go, lost, or otherwise corrupted when power fails. The apportionment between critical and non-critical data may be configured to determine the capacity of non-volatile memory needed to meet particular specifications for NVDIMM 400. In another embodiment, the apportionment between critical and non-critical data may be configured to determine the capacity of non-volatile memory needed to meet application requirements in which NVDIMM 400 is to be used. In operation, NVDIMM 400 may receive an indication that there is a system power loss by an input signal SAVE 430. Under this condition, memory controller 400 may be thus triggered to store the vulnerable data in DRAM 410 and the captured data in MRAM 408 to the persistent NAND flash device 414.

NVDIMM 400 may be any type of NVDIMM, such as, e.g., an NVIMM-P device, in which both DRAM 410 and NAND flash device 414 are memory-mapped (e.g., memory is uniquely addressable in a computer system). However, it is to be appreciated that other types of NVDIMM devices are contemplated (e.g., NVDIMM-N, NVDIMM-F, etc.).

In some embodiments, memory controller 406 may capture an initial copy of data 450, and any incremental changes to the initial copy, in either MRAM 408, NAND flash device 414, or both. Memory controller 406 then may capture subsequent incremental data changes from DRAM 410 (e.g., volatile memory) during persistence capture intervals and may store the captured data in the relatively faster MRAM 408. As discussed above with reference to FIGS. 2A-2C, when there is a system fail, a back-up power may not be needed because vulnerable data also is captured and stored in the relatively faster MRAM 408. Any incremental changes in the initial copy may be captured at periods with various frequencies. For example, capturing incremental changes with higher frequency updates may minimize any potential data loss between system-failure events. As discussed above, the vulnerable data may be apportioned between critical and non-critical data. In some embodiments, the frequency of the persistence capture intervals may be configured according to the relative apportionment of critical data to non-critical data. For example, critical data may be assigned a higher priority and therefore stored at more frequent intervals to the relatively faster non-volatile memory. The relative apportionment between critical and non-critical data may be defined in registers, which may be part of either MRAM 408, NAND flash device 414, or both.

In some embodiments, the incremental updates may occur when a certain amount of data change units are collected, after a specified amount of time has lapsed, or in response to other conditions or events. Memory controller 406 may, for example, coordinate the incremental updates to the initial copy when bus resources are available for transfer of the incremental updates to NAND flash device 414. The incremental data captures may be periodic, or they may be asynchronous.

Memory controller 406 may trigger a transfer of incremental updates to the NAND flash device 414 based on time, exceeding log capacity, high water mark, or in response to any suitable signal. A complete copy of the initial data stored in DRAM 410 may, for example, be installed in NAND flash device 414 during a system initialization. A complete copy may also be written at any time at the memory controller's request. In some embodiments, a complete copy of data can be created during power-on using a copy from a previous session and applying updates stored in NAND flash device 414 using allocated update space.

It should be noted that NVDIMM 400 may be a separate device than a system controller (e.g., system controller 102 as described above with reference to FIG. 1), or NVDIMM 400 may be embedded in the same device as system controller 102. NVDIMM 400 also can be a standalone module with a connector and an electrical interface. NVDIMM 400 can be part of an assembly attached to system controller 102 using a cable, a network, or a wireless connection. Alternatively, NVDIMM 400 can be used in other computer memory configurations.

Figure 5:
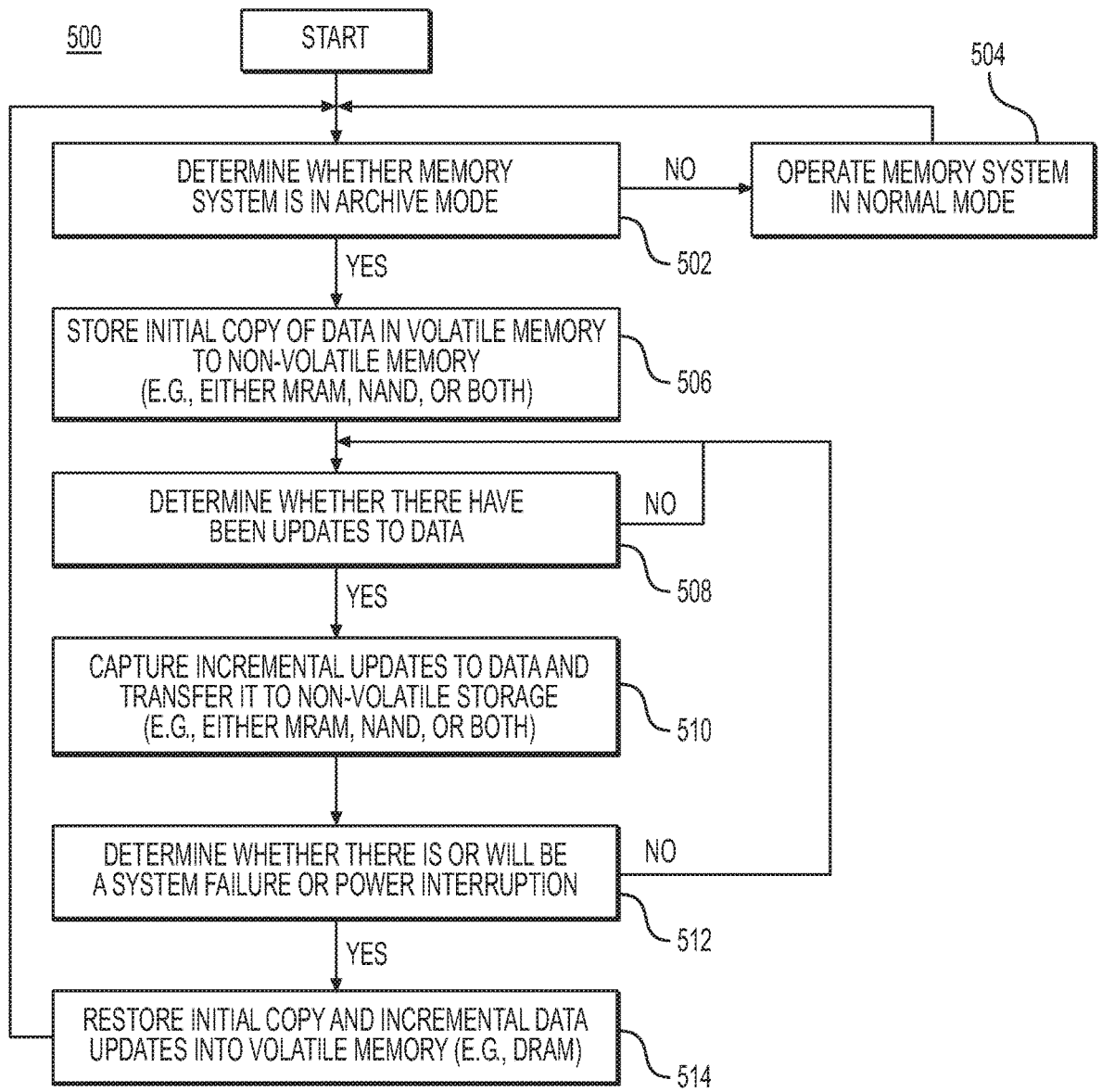
FIG. 5 depicts a flowchart of steps of one example of managing persistent memory in an NVDIMM device, according to another aspect of the present disclosure.

With reference now to FIG. 5, there is depicted a method 500 for managing persistent memory in an NVDIMM device. As explained in further detail below, method 500 may include, but is not limited to, detecting whether there has been an interruption to system power, and, based on that detection, adjusting whether vulnerable data in volatile memory is committed to persistent memory. Method 500 is illustrated as a collection of blocks in a logical flow diagram, which represents a sequence of operations, some or all of which may be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures, and environments described in the examples herein, although the processes may be implemented in a wide variety of other frameworks, architectures, or environments.

Method 500 may begin with determining whether there is, or will be, a system failure or power interruption to a multi-tiered memory system (step 501). The multi-tiered memory system includes one or more memory devices of a first memory type (e.g., volatile memory) and one or more memory devices of a second memory type (e.g., non-volatile memory). For example, a system controller (e.g., such as the system controller 102 discussed above with reference to FIG. 1) may monitor the power status (e.g., input power, system power rails, etc.) of the multi-tiered memory system during an initialization period and/or at periodic intervals. If the system controller (or a memory controller) identifies an actual or potential (e.g., impending) system failure or power interruption, the system controller proceeds to step 506, which is explained in greater detail below. If it is determined that there is no system failure or impending power interruption, however, the system controller then may determine whether the multi-tiered memory system is to operate in an archive mode (step 502). The system controller may send a command to initialize an archiving mode of the multi-tiered memory system. In the archiving mode, the multi-tiered memory system may store a back-up of the data stored in volatile memory to the non-volatile memory. The archive mode may be periodically (e.g., every 1 minute, 5 minutes, 15 minutes, 30 minutes, 1 hour, or once every day, week, or month) entered to commit data stored in volatile memory to the non-volatile memory. The back-up of the data may be stored to a selected portion of the non-volatile memory, which may be configurable or hard-wired. In other embodiments, memory controller 104 can initiate an archiving mode of the multi-tiered memory system during boot-up or other initialization procedure. The multi-tiered memory system can receive the command from system controller 102 (and/or from memory controller 406) to archive data stored in DRAM 410 (e.g., volatile memory) to either the MRAM 408, NAND flash device 414, or both. If the multi-tiered memory system is not in the archive mode (or not due to enter the archive mode) at step 502, system controller 102 (and/or memory controller 406) operates in a normal mode where DRAM 410 operates without archiving (step 504). While operating in a normal mode, system controller 102 (and/or memory controller 406) may return to step 501, e.g., monitoring for a future power interruption or other system failure. If system controller 102 (and/or memory controller 406) determines that the multi-tiered memory system is in archive mode at step 502, or it is determined at step 501 that there is, or will be, a system failure or power interruption, the system controller 102 (and/or memory controller 406) may capture an initial copy of data in the DRAM 410 and store the initial copy in either of the non-volatile memory devices (e.g., either MRAM 408, NAND flash device 414, and/or both) (step 506).

After the initial copy is stored in one or more of the non-volatile memory devices, the multi-tiered memory system can notify system controller 102 (and/or memory controller 406) that it is ready for archiving mode and starts to track incremental updates to data in DRAM 410. For example, system controller 102 (and/or memory controller 406) can perform a form of incremental data tracking (e.g., journaling) to track updates to the data. System controller 102 (and/or memory controller 406) then may determine if the data is updated (step 508). If there have been updates to the data, system controller 102 (and/or memory controller 406) may capture incremental updates to the data and transfers it to a non-volatile storage device, e.g., NAND flash device 414 (step 510). System controller 102 (and/or memory controller 406) may capture incremental updates to data stored in DRAM 410 in any suitable frequency. For example, system controller 102 (and/or memory controller 406) may transfer the incremental updates based on time (e.g., at periodic intervals), based on exceeding log capacity, based on exceeding a high mark or threshold, or in response to processing system requests.

In some aspects, system controller 102 (and/or memory controller 406) then may be configured to determine whether power is restored or other system failure is resolved (step 512). When system controller 102 (and/or memory controller 406) identifies that power is restored or other system failure is resolved, system controller 102 (and/or memory controller 406) may restore the initial copy of data, and/or any incremental updates of data into DRAM 410 (step 514), and may return to step 501, e.g., monitoring for a future power interruption or other system failure.

System controller 102 (and/or memory controller 406) can restore the initial copy stored in either MRAM 408 or NAND flash device 414, along with any incremental updates stored in either MRAM 408 or NAND flash device 414, as explained above. System controller 102 (and/or memory controller 406) may continue to capture incremental updates and store them to either MRAM 408, NAND flash device 414, or both, based on time (e.g., at periodic intervals), based on exceeding log capacity, based on exceeding a high mark or threshold, or in response to processing system requests.

Non-Volatile Persistence in Enterprise-Level SSD Storage Systems

Solid-state drives (SSDs) may be used in storage memory implementations, such as, e.g., within storage memory 114 described above with reference to FIG. 1. SSDs generally include a circuit board, non-volatile memory (e.g., flash), and a memory controller. An M.2 SSD is one example of an SSD in a smaller form factor generally including a small card and a small edge connector. Because M.2 SSDs may include relatively higher storage capacities in the range up to 1-2 terabytes (TB), combining a number of M.2 SSDs would generally make them suitable for enterprise-level storage systems (e.g., a storage system with ten M.2 SSDs may have up to 10-20 TB storage capacity). But in the event of a power loss, there is a risk that data not copied to the relatively slower non-volatile memory devices (e.g., flash devices) in time will be lost without adequate back-up measures.

Therefore, another aspect of the present disclosure is directed to techniques and implementations for using a multi-tiered memory scheme (e.g., two-tier memory type scheme) to leverage relatively faster persistent memory to reduce the risk of data loss in enterprise-level SSD implementations.

Figure 6:
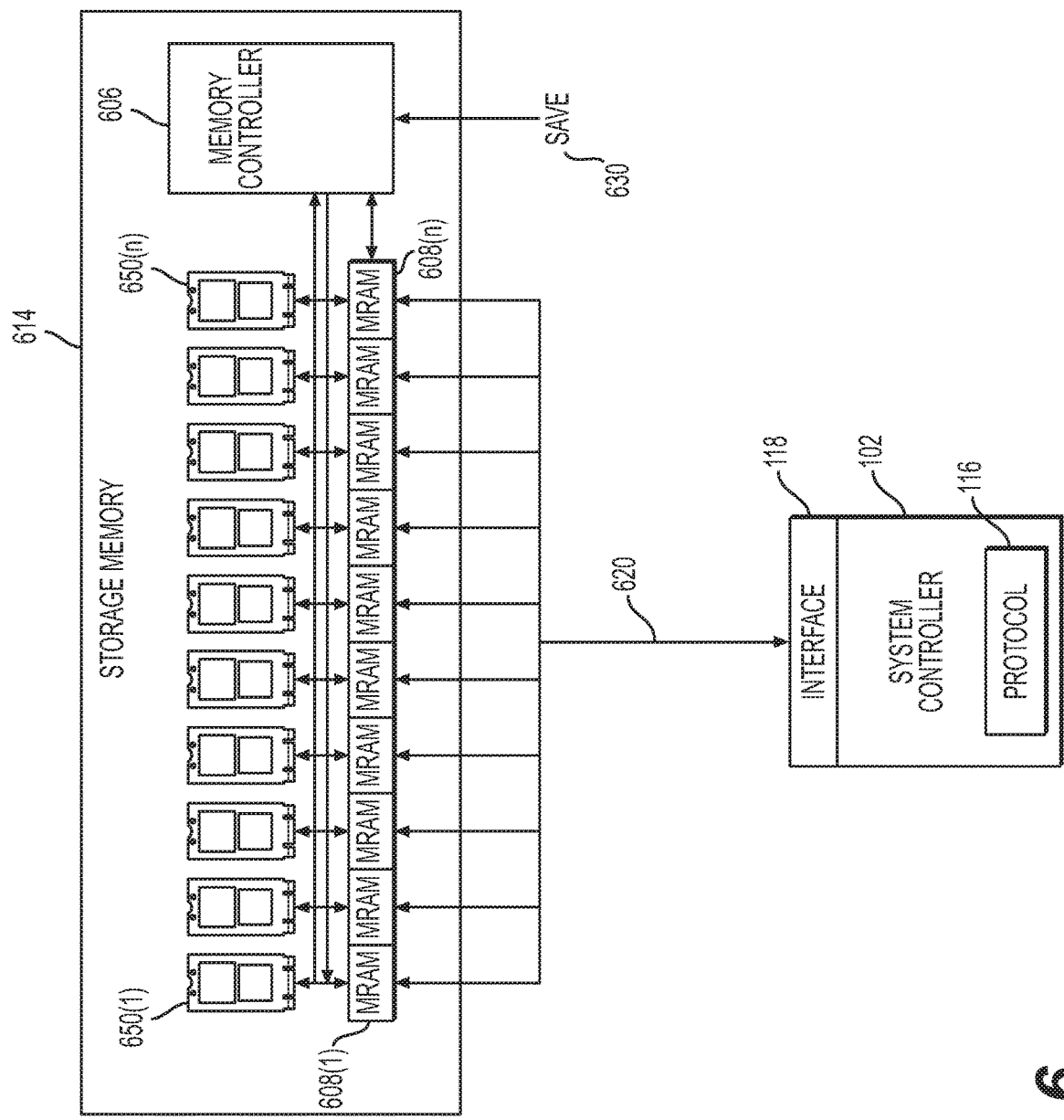
FIG. 6 depicts a block diagram of select components of an exemplary storage system, according to one aspect of the present disclosure.

With reference now to FIG. 6, there is depicted a storage memory 614 with a series of SSDs 650(1)-(*n*) (e.g., relatively slower but higher capacity non-volatile memory, such as, e.g., the smaller form factor M.2 SSDs) and MRAM 608(1)-(*n*) (e.g., relatively faster but lower capacity non-volatile memory) devices. In operation, SSDs 650(1)-(*n*) may be configured to store incoming data communicated via bus 620. However, because SSDs 650(1)-(*n*) generally may be relatively slower-access devices, not all incoming data may be stored in time in the event of power loss or after system failure. By placing MRAM 608(1)-(*n*) devices in the data path for each of the SSDs 650(1)-(*n*), the faster write speed of each MRAM 608(1)-(*n*) device is leveraged to capture any unwritten data that was intended for each of their respective SSDs 650(1)-(*n*). Data intended for persistent storage may be stored as a series of data bits from system controller 102, through the in-path MRAM 608(1)-(*n*) devices, and into the SSDs 650(1)-(*n*), via bus 620. The series of data bits may pass through the in-path MRAM 608(1)-(*n*) devices on a rolling basis before being written into the SSDs 650(1)-(*n*). The MRAM 608(1)-(*n*) devices may capture a copy of the data bits as they pass through. The MRAM 608(1)-(*n*) devices therefore may retain a copy of data bits that have yet to be stored ("unwritten data") into the SSDs 650(1)-(*n*). In some embodiments, storage memory 614 may be configured to include an MRAM device 608 for each of the SSDs 650. In other embodiments, storage memory 614 may be configured to include an MRAM device 608 for selected SSDs 650. Still further, storage memory 614 may be configured to include an MRAM device 608 that can be configured to correspond to one or more selected SSDs 650. In other embodiments, storage memory 614 may be configured to include an MRAM device 608 for selected SSDs 650. In operation, memory controller 606 may, for example, receive an input signal SAVE 630, indicating that there is, or will be, a system power loss. Memory controller 606 then may direct the unwritten data captured in each of the MRAM 608(1)-(n) devices to be stored in the respective SSDs 650(1)-(n). While MRAM technology is discussed for the in-path non-volatile memory, it is to be appreciated that other forms of non-volatile memory may be used in place of, or in addition to, the in-path MRAM devices. The configurability of the in-path non-volatile memory may be register-based, or may be based on information stored in other non-volatile forms (e.g., dip switches, fuses, non-volatile memory, etc.).

Figure 7:
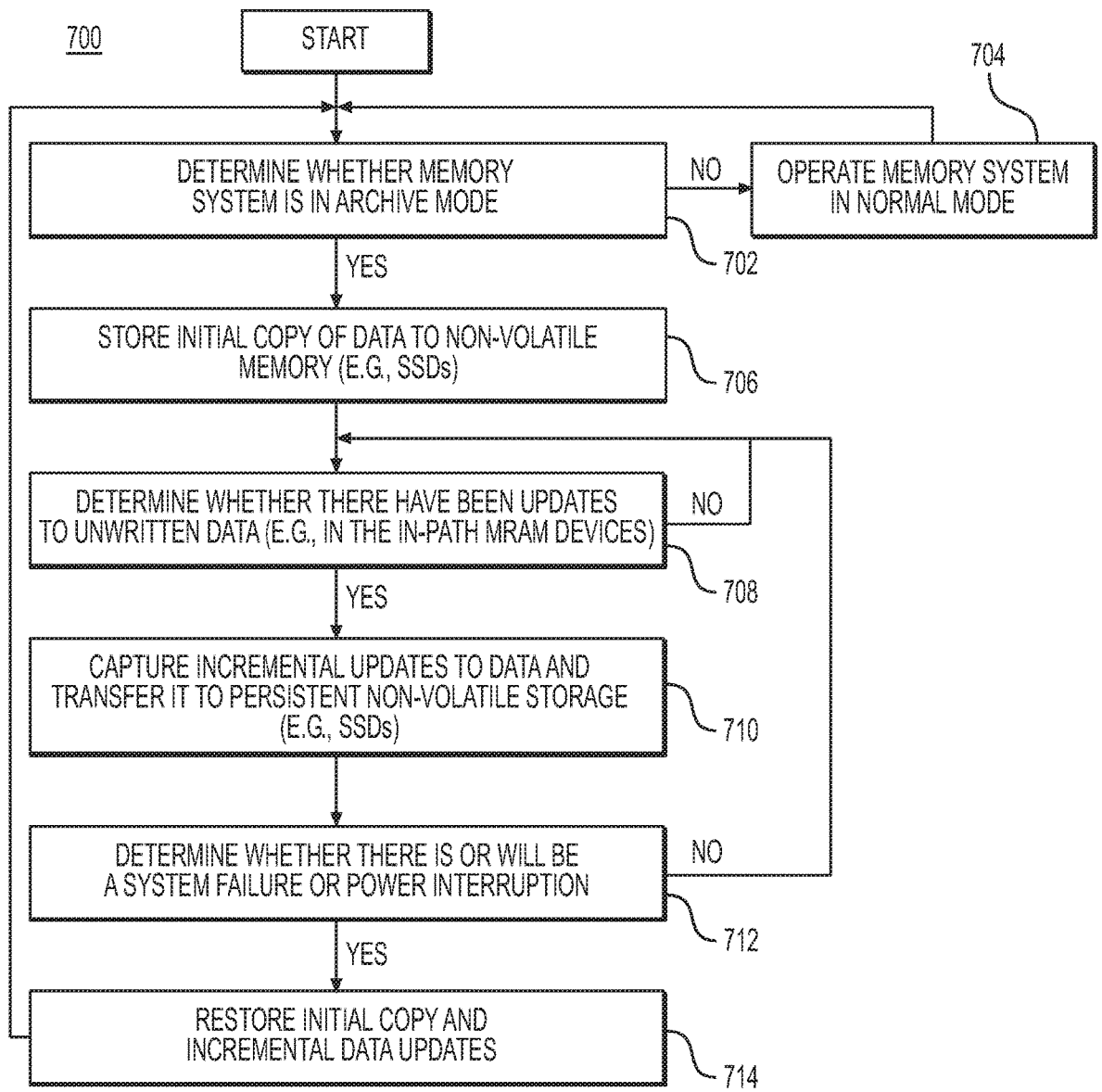
FIG. 7 depicts a flowchart of steps of one example of managing persistent memory in a storage system, according to another aspect of the present disclosure.

With reference now to FIG. 7, there is depicted a method 700 for managing persistent memory in a storage memory 614 with SSDs. As explained in further detail below, method 700 may include, but is not limited to, detecting whether there has been an interruption to system power, and, based on that detection, capturing unwritten data by relatively faster in-path non-volatile memory (e.g., MRAM 608(1)-(n)) and committing it to persistent memory (e.g., SSDs 650(1)-(n)). Method 700 is illustrated as a collection of blocks in a logical flow diagram, which represents a sequence of operations, some or all of which may be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures, and environments described in the examples herein, although the processes may be implemented in a wide variety of other frameworks, architectures, or environments.

Method 700 may begin with determining whether there is, or will be, a system failure or power interruption to a multi-tiered memory system (step 701). The multi-tiered memory system may include one or more non-volatile memory devices. For example, system controller 102 (and/or memory controller 606) may monitor the power status (e.g., input power, system power rails, etc.) of the multi-tiered memory system during an initialization period and/or at periodic intervals. If the system controller identifies an actual or potential (e.g., impending) system failure or power interruption, the system controller proceeds to step 706, which is explained in greater detail below. If it is determined that there is no system failure or impending power interruption, however, the system controller then may determine whether the multi-tiered memory system is to operate in an archive mode (step 702). The system controller may send a command to initialize an archiving mode of the multi-tiered memory system in which the multi-tiered memory system stores a back-up of data in the non-volatile memory (e.g., SSDs 650(1)-(n)). The archive mode may be periodically (e.g., every 1 minute, 5 minutes, 15 minutes, 30 minutes, 1 hour, or once every day, week, or month) entered to commit data stored in volatile memory to the non-volatile memory. The back-up of the data may be stored to a selected portion of the non-volatile memory, which may be configurable or hard-wired. In other embodiments, memory controller 606 can initiate an archiving mode of the multi-tiered memory system during boot-up or other initialization procedure. The multi-tiered memory system can receive a command from system controller 102 (and/or from memory controller 606) to archive unwritten data that may be stored in the MRAM 608(1)-(n) devices to SSDs 650(1)-(n). If the multi-tiered memory system is not in the archive mode (or not due to enter the archive mode) at step 702, system controller 102 (and/or memory controller 606) may operate in a normal mode where SSDs 650(1)-(n) operates without archiving (step 704). While operating in a normal mode, system controller 102 (and/or memory controller 606) may return to step 701, e.g., monitoring for a future power interruption or other system failure. If system controller 102 (and/or memory controller 606) determines that the multi-tiered memory system is in the archive mode at step 702, or it is determined at step 701 that there is, or will be, a system failure or power interruption, the system controller 102 (and/or memory controller 606) may capture an initial copy of unwritten data in the in-path MRAM 608(1)-(n) and stores the initial copy to the SSDs 650(1)-(n) (step 706).

After the initial copy is stored in SSDs 650(1)-(n), the multi-tiered memory system can notify system controller 102 (and/or memory controller 606) that it is ready for archiving mode and starts to track incremental updates of unwritten data in the in-path MRAM 608(1)-(n) devices. For example, system controller 102 (and/or memory controller 606) can perform a form of incremental data tracking (e.g., journaling) to track updates to the unwritten data stored in the in-path MRAM 608(1)-(n) devices. System controller 102 (and/or memory controller 606) then determines if the data is updated (step 708). If there have been updates to the data, system controller 102 (and/or memory controller 606) captures incremental updates to the unwritten data and transfers it to SSDs 650(1)-(n) (step 710). System controller 102 (and/or memory controller 606) can transfer the incremental updates based on time (e.g., at periodic intervals), based on exceeding log capacity, based on exceeding a high mark or threshold, or in response to processing system requests.

In some aspects, system controller 102 (and/or memory controller 606) then may be configured to determine whether power is restored or other system failure is resolved (step 712). When system controller 102 (and/or memory controller 606) identifies that power is restored or other system failure is resolved, system controller 102 (and/or memory controller 606) may restore the initial copy of data, and/or any incremental updates to the unwritten data into SSDs 650(1)-(n) (step 714), and may return to step 701, e.g., monitoring for a future power interruption or other system failure. System controller 102 (and/or memory controller 606) may continue to capture incremental updates and store them to the SSDs 650(1)-(n), based on time (e.g., at periodic intervals), based on exceeding log capacity, based on exceeding a high mark or threshold, or in response to processing system requests.

Non-Volatile Persistence in Remote Configurations

An application program interface (API) may generally enable persistent memory, such as, e.g., persistent memory on an input/output (IO) access subsystem, to present as local memory to a computing system, even if the persistent memory may be remotely located. Therefore, another aspect of the present disclosure is directed to techniques and implementations for leveraging relatively faster persistent memory that may be remotely located from a computing system.

Figure 8:
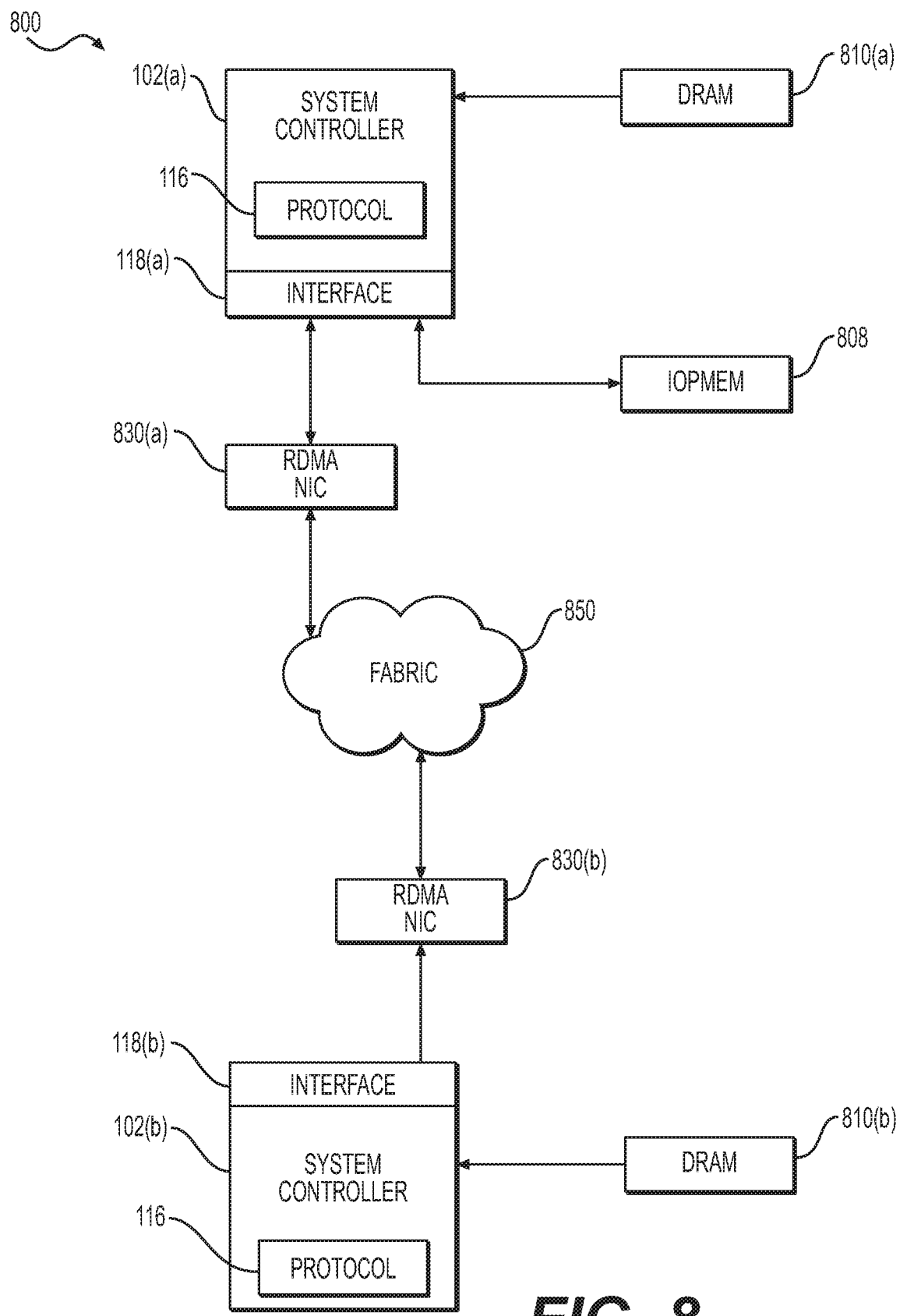
FIG. 8 depicts a block diagram of select components of an exemplary computing system with I/O-mapped persistent memory, according to one aspect of the present disclosure.

With reference now to FIG. 8, there is depicted a computing system 800 with a first system controller 102(a) and a second system controller 102(b). Each of the first system controller 102(a) and the second system controller 102(b) may be connected to each other via a network fabric 850 (e.g., network topology in which components pass data to each other through interconnecting switches). The first system controller 102(a) may connect to the network fabric 850 via a remote direct memory access (RDMA) network interface card (NIC) 830(a). The second system controller 102(b) may connect to the fabric 850 via an RDMA NIC 830(b). Each of the RDMA NIC 830(a) and RDMA NIC 830(b) may connect to system controllers 102(a) and 102(b) via physical interfaces 118(a) and 118(b), respectively. Persistent memory 808 (e.g., relatively faster persistent non-volatile memory, such as I/O-mapped MRAM) may be located locally (e.g., within the same motherboard, computing chassis, computing rack, or computing room) to system controller 102(a). Persistent memory 808 may be located remotely (e.g., 5 miles away) from second system controller 102(b) via network fabric 850.

In one embodiment, the first system controller 102(a) may detect a system power loss and thus direct the contents of DRAM 810(a) (e.g., volatile memory) to be locally stored in persistent memory 808. In another embodiment, the second system controller 102(b) may detect a system power loss and thus direct the contents of DRAM 810(b) (e.g., volatile memory) to be remotely stored in persistent memory 808 through its connection via network fabric 850. System controller 102(b) may therefore be able to leverage the persistence and relatively fast access speed of persistent memory 808 for back-ups even while remotely located.

Figure 9:
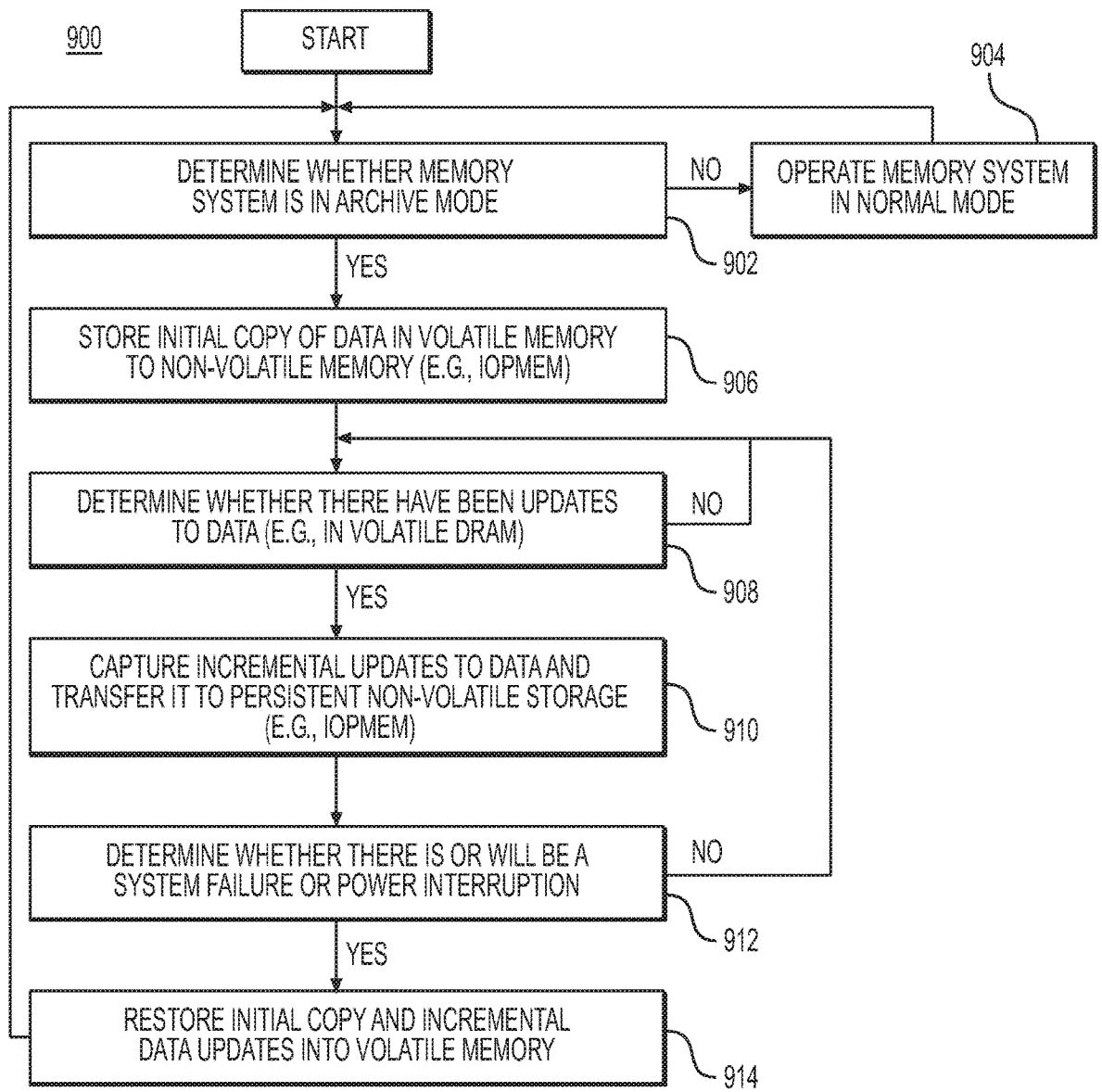
FIG. 9 depicts a flowchart of steps of one example of managing remotely-located persistent memory, such as, e.g., persistent memory on an input/output (IO) access subsystem, according to another aspect of the present disclosure.

With reference now to FIG. 9, there is depicted a method 900 for managing I/O-mapped persistent memory in a computing system 800. As explained in further detail below, method 900 may include, but is not limited to, detecting whether there has been an interruption to system power, and, based on that detection, storing vulnerable data to persistent memory 808. Method 900 is illustrated as a collection of blocks in a logical flow diagram, which represents a sequence of operations, some or all of which may be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures, and environments described in the examples herein, although the processes may be implemented in a wide variety of other frameworks, architectures, or environments.

Method 900 begins with determining whether there is, or will be, a system failure or power interruption to a multi-tiered memory system (step 901). The multi-tiered memory system includes one or more non-volatile memory devices. For example, system controller 102(a) (or system controller 102(b)) may monitor the power status (e.g., input power, system power rails, etc.) of the multi-tiered memory system during an initialization period and/or at periodic intervals. If the system controller identifies an actual or potential (e.g., impending) system failure or power interruption, the system controller proceeds to step 906, which is explained in greater detail below. If it is determined that there is no system failure or impending power interruption, however, the system controller then may determine whether the multi-tiered memory system is to operate in an archive mode (step 902). The system controller may send a command to initialize an archiving mode of the multi-tiered memory system in which the multi-tiered memory system stores a back-up of data in the non-volatile memory (e.g., persistent memory 808). The archive mode may be periodically (e.g., every 1 minute, 5 minutes, 15 minutes, 30 minutes, 1 hour, or once every day, week, or month) entered to commit data stored in volatile memory to the non-volatile memory. The back-up of the data may be stored to a selected portion of the non-volatile memory, which may be configurable or hard-wired. In other embodiments, system controller 102(a) or 102(b) can initiate an archiving mode of the multi-tiered memory system during boot-up or other initialization procedure. The multi-tiered memory system can receive the command from system controller 102(a) or 102(b) to archive data stored in DRAM 810(a) or 810(b) to persistent memory 808. If the multi-tiered memory system is not in the archive mode (or not due to enter the archive mode) at step 902, system controller 102(a) or 102(b) may operate in a normal mode where persistent memory 808 operates without archiving (step 904). While operating in a normal mode, system controller 102(a) or 102(b) may return to step 901, e.g., monitoring for a future power interruption or other system failure. If system controller 102(a) or 102(b) determines that the multi-tiered memory system is in an archive mode at step 902, or it is determined at step 901 that there is, or will be, a system failure or power interruption, the system controller 102(a) or 102(b) may capture an initial copy of data in either DRAM 810(a) or 810(b) and stores the initial copy in persistent memory 808 (step 906).

After the initial copy is stored in persistent memory 808, the multi-tiered memory system can notify system controller 102(a) or 102(b) that it is ready for archiving mode and starts to track incremental updates of data in DRAM 810(a) or 810(b). For example, system controller 102(a) or 102(b) can perform a form of incremental data tracking (e.g., journaling) to track updates to the data stored in the DRAM 810(a) or 810(b). System controller 102(a) or 102(b) then determines if the data is updated (step 908). If there have been updates to the data, system controller 102(a) or 102(b) captures incremental updates to the data and transfers it to persistent memory 808 (step 910). System controller 102(a) or 102(b) can transfer the incremental updates based on time (e.g., at periodic intervals), based on exceeding log capacity, based on exceeding a high mark or threshold, or in response to processing system requests.

In some aspects, system controller 102(a) or 102(b) then may be configured to determine whether power is restored or other system failure is resolved (step 912). When system controller 102(a) or 102(b) identifies that power is restored or other system failure is resolved, system controller 102(a) or 102(b) may restore the initial copy of data, and/or any incremental updates to the data into DRAM 810(a) or 810(b) (step 914), and may return to step 901, e.g., monitoring for a future power interruption or other system failure. System controller 102(a) or 102(b) may continue to capture incremental updates and store them to persistent memory 808, based on time (e.g., at periodic intervals), based on exceeding log capacity, based on exceeding a high mark or threshold, or in response to processing system requests. As discussed above, the back-up of vulnerable data may be apportioned between critical and non-critical data. The relative apportionment may be configured such that critical data (e.g., data critical to system operation or data instructive for recovering other data, e.g., non-critical data) may be assigned a higher priority and thus may be stored at more frequent intervals to faster non-volatile memory. Non-critical data may be assigned a lower priority and thus may be stored at less frequent intervals and/or stored to slower non-volatile memory (e.g., NAND flash devices).

Persistent Write Cache in Enterprise-Level SSD Storage Systems

Solid-state drives (SSDs) may be used in storage memory implementations, such as, e.g., within storage memory 114 described above with reference to FIG. 1. SSDs generally include a circuit board, non-volatile memory (e.g., flash), and a memory controller. As described above with reference to FIG. 6, for example, an M.2 SSD is one example of an SSD in a smaller form factor generally including a small card and a small edge connector. Because M.2 SSDs may include relatively higher storage capacities in the range up to approximately 1-2 terabytes (TB), combining a number of M.2 SSDs would generally make them suitable for enterprise-level storage systems (e.g., a storage system with ten M.2 SSDs may have up to 10-20 TB storage capacity). But in the event of a power loss, there is a risk that data not copied to the relatively slower non-volatile memory devices (e.g., flash devices) in time will be lost without adequate back-up measures.

Therefore, another aspect of the present disclosure is directed to techniques and implementations for using a multi-tiered memory scheme (e.g., two-tier memory type scheme) to leverage relatively faster persistent memory to reduce the risk of data loss in enterprise-level SSD implementations.

Figure 10:
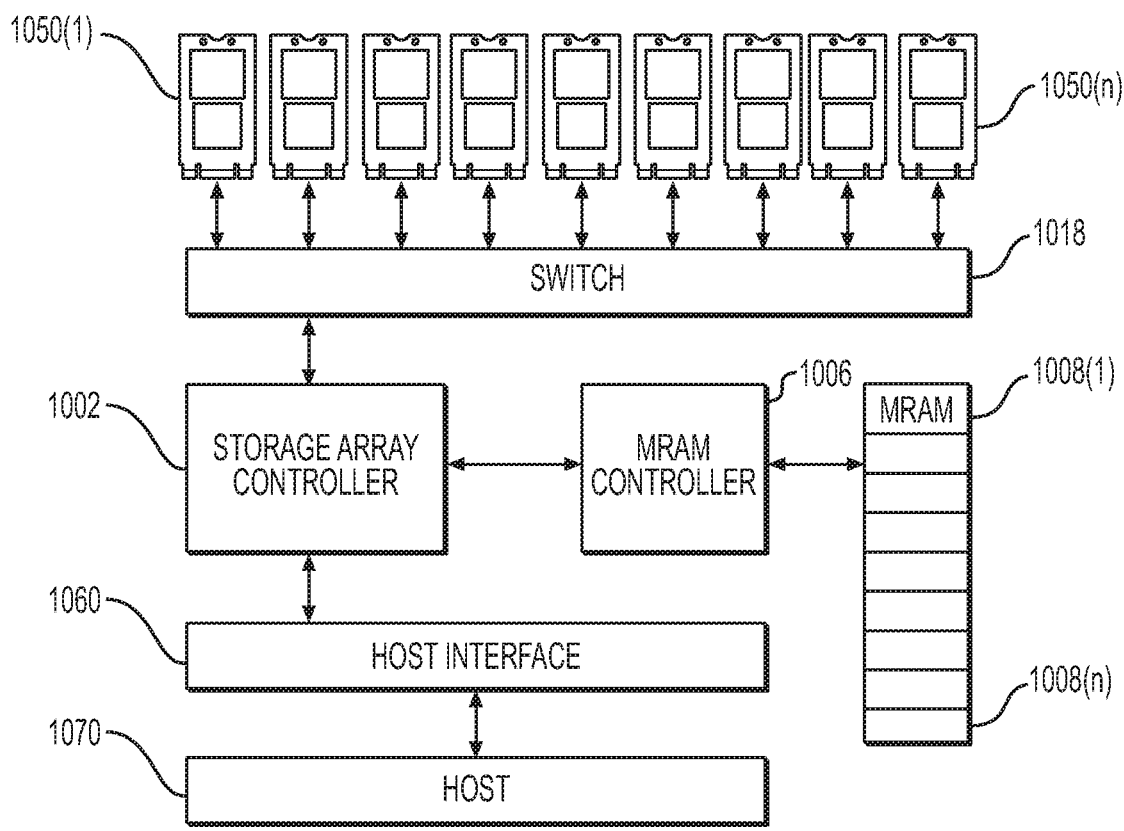
FIG. 10 depicts a block diagram of select components of an exemplary SSD storage system, according to one aspect of the present disclosure.

With reference now to FIG. 10, there is depicted an array of SSDs 1050(1)-(n) (e.g., relatively slower but higher capacity non-volatile memory, such as, e.g., the smaller form factor M.2 SSDs described above) and an array of MRAM 1008(1)-(n) (e.g., relatively faster but lower capacity non-volatile memory) devices. A storage array controller 1002 may be configured to present the array of SSDs 1050(1)-(n) as individual SSDs, or as a unified storage block, to host 1070. When presenting the array of SSDs 1050(1)(n) as a unified storage block, for example, the storage array controller 1002 may implement any suitable storage protocol, such as e.g., redundant array of independent disks (RAID), just a bunch of disks (JBOD), etc. The storage array controller 1002 may be connected to host 1070 via a host interface 1060. The host interface 1060 may be any suitable high-bandwidth host interface, including, but not limited to, a high-bandwidth optical interface, such as e.g., fiberchannel, infiniband, etc.

In operation, SSDs 1050(1)-(n) may be configured to store incoming data communicated from storage array controller 1002 via switch 1018. Switch 1018 may be any suitable high-speed interface, such as e.g., peripheral component interconnect express (PCIe), non-volatile memory express (NVMe), etc. Because SSDs 1050(1)-(n) generally may be relatively slower-access devices, not all incoming data from storage array controller 1002 may be stored in time in the event of power loss or other system failure. The array of MRAM 1008(1)-(n) devices therefore may be configured as persistent write cache to capture any unwritten data that was intended for the array of SSDs 1050(1)-(n). Data intended for persistent storage may be stored as a series of data bits from storage array controller 1002, both into the SSDs 1050(1)-(n), via switch 1018, and into MRAM 1008(1)-(n), via MRAM controller 1006. The series of data bits may be written to the MRAM 1008(1)-(n) devices on a rolling basis as they are being written to the SSDs 1050(1)-(n). The MRAM 1008(1)-(n) devices, therefore, may retain a copy of data bits that have yet to be stored ("unwritten data") into the SSDs 1050(1)-(n). In some embodiments, MRAM controller 1006 may be configured to be coupled to an MRAM device 1008 for each of the SSDs 1050. In other embodiments, MRAM controller 1006 may be configured to be coupled to a single MRAM device 1008 corresponding to a plurality of selected SSDs 1050. Still further, MRAM controller 1006 may be configured to be coupled to an MRAM device 1008 that can be configured to correspond to one or more selected SSDs 1050.

In operation, storage array controller 1002 may, for example, receive an indication that there is, or will be, a system power loss. Storage array controller 1002 then may direct the unwritten data captured in each of the MRAM 1008(1)-(n) devices to be stored in the respective SSDs 1050(1)-(n). While MRAM technology is discussed for the persistent write cache, it is to be appreciated that other forms of non-volatile memory may be used in place of, or in addition to, the described MRAM devices. The configurability of the non-volatile memory may be register-based, or may be based on information stored in other non-volatile forms (e.g., dip switches, fuses, non-volatile memory, etc.). In other embodiments, the MRAM 1008(1)-(n) devices may be configured to include metadata and/or storage array health data that may be used for rapid drive recovery in the event of power failures.

Figure 11:
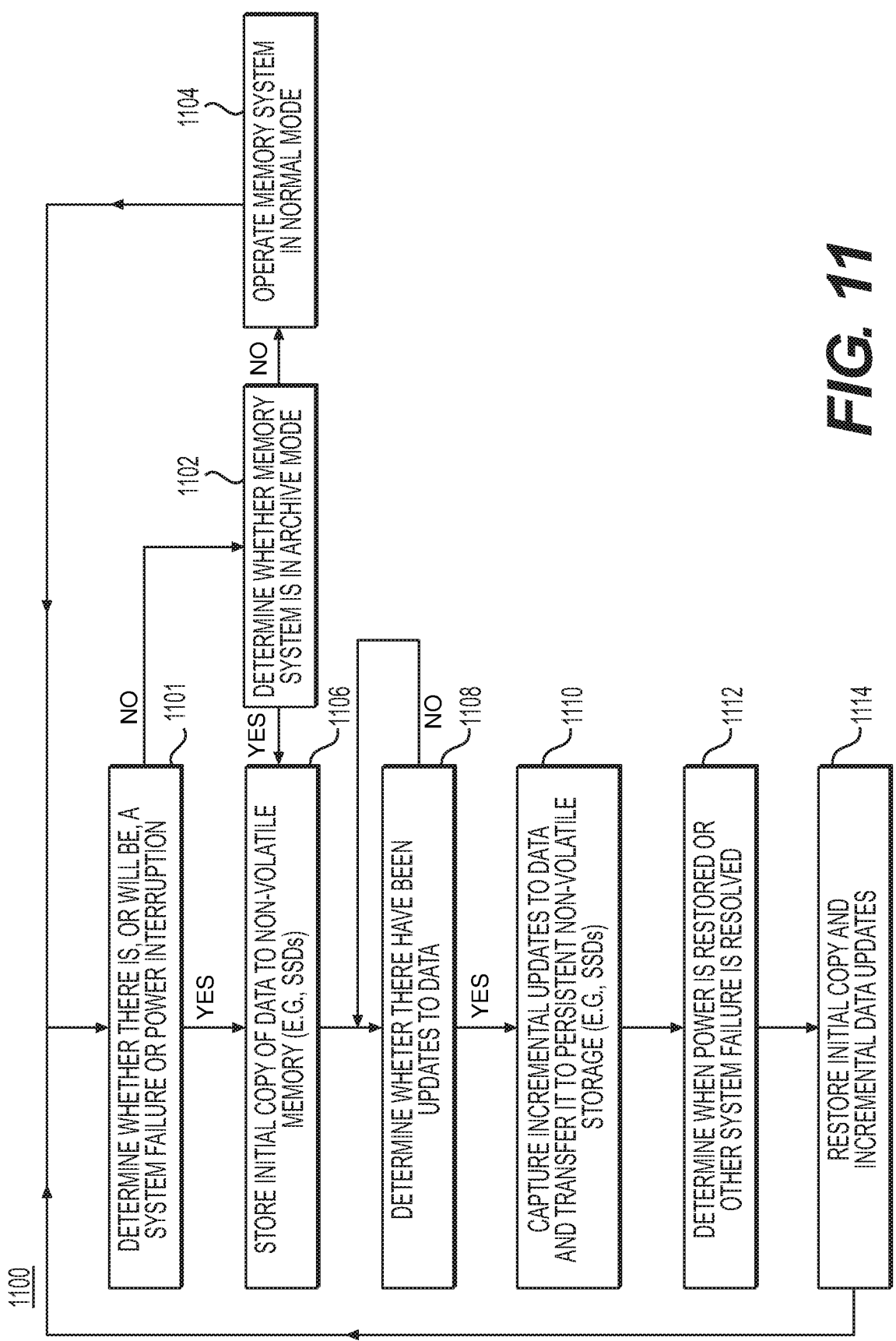
FIG. 11 depicts a flowchart of steps of one example of managing persistent memory in a storage system, according to another aspect of the present disclosure.

With reference now to FIG. 11, there is depicted a method 1100 for managing persistent memory in a storage system with SSDs. As explained in further detail below, method 1100 may include, but is not limited to, detecting whether there has been an interruption to system power, and, based on that detection, capturing unwritten data by relatively faster non-volatile memory (e.g., MRAM 1008(1)-(n)) and committing it to persistent memory (e.g., SSDs 1050(1)-(n)). Method 1100 is illustrated as a collection of blocks in a logical flow diagram, which represents a sequence of operations, some or all of which may be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures, and environments described in the examples herein, although the processes may be implemented in a wide variety of other frameworks, architectures, or environments.

Method 1100 may begin with determining whether there is, or will be, a system failure or power interruption to a multi-tiered memory system (step 1101). The multi-tiered memory system may include one or more non-volatile memory devices. For example, storage array controller 1002 (and/or MRAM controller 1006 or another system controller) may monitor the power status (e.g., input power, system power rails, etc.) of the multi-tiered memory system during an initialization period and/or at periodic intervals. If the system controller identifies an actual or potential (e.g., impending) system failure or power interruption, the system controller proceeds to step 1106, which is explained in greater detail below. If it is determined that there is no system failure or impending power interruption, however, the system controller then may determine whether the multi-tiered memory system is to operate in an archive mode (step 1102). The system controller may send a command to initialize an archiving mode of the multi-tiered memory system in which the multi-tiered memory system stores a back-up of data in the non-volatile memory (e.g., MRAM 1008(1)-(*n*)). The archive mode may be periodically (e.g., every 1 minute, 5 minutes, 15 minutes, 30 minutes, 1 hour, or once every day, week, or month) entered to commit data stored in volatile memory to the non-volatile memory. The back-up of the data may be stored to a selected portion of the non-volatile memory, which may be configurable or hard-wired. In other embodiments, MRAM controller 1006 can initiate an archiving mode of the multi-tiered memory system during boot-up or other initialization procedure. The multi-tiered memory system can receive a command from storage array controller 1002 (and/or from MRAM controller 1006) to archive unwritten data that may be stored in the MRAM 1008(1)-(*n*) devices to SSDs 1050(1)-(*n*). If the multi-tiered memory system is not in the archive mode (or not due to enter the archive mode) at step 1102, storage array controller 1002 (and/or MRAM controller 1006) may operate in a normal mode where SSDs 1050(1)-(*n*) operates without archiving (step 1104). While operating in a normal mode, storage array controller 1002 (and/or MRAM controller 1006) may return to step 1101, e.g., monitoring for a future power interruption or other system failure. If storage array controller 1002 (and/or MRAM controller 1006) determines that the multi-tiered memory system is in the archive mode at step 1102, or it is determined at step 1101 that there is, or will be, a system failure or power interruption, the storage array controller 1002 (and/or MRAM controller 1006) may capture an initial copy of unwritten data in the MRAM 1008(1)-(*n*) and stores the initial copy to the SSDs 1050(1)-(*n*) (step 1106).

After the initial copy is stored in SSDs 1050(1)-(*n*), the multi-tiered memory system can notify storage array controller 1002 (and/or MRAM controller 1006) that it is ready for archiving mode and starts to track incremental updates of unwritten data in the MRAM 1008(1)-(*n*) devices. For example, storage array controller 1002 (and/or MRAM controller 1006) can perform a form of incremental data tracking (e.g., journaling) to track updates to the unwritten data stored in the MRAM 1008(1)-(*n*) devices. Storage array controller 1002 (and/or MRAM controller 1006) then determines if the data is updated (step 1108). If there have been updates to the data, storage array controller 1002 (and/or MRAM controller 1006) captures incremental updates to the unwritten data and transfers it to SSDs 1050(1)-(*n*) (step 1110). Storage array controller 1002 (and/or MRAM controller 1006) can transfer the incremental updates based on time (e.g., at periodic intervals), based on exceeding log capacity, based on exceeding a high mark or threshold, or in response to processing system requests.

In some aspects, storage array controller 1002 (and/or MRAM controller 1006) then may be configured to determine whether power is restored or other system failure is resolved (step 1112). When storage array controller 1002 (and/or MRAM controller 1006) identifies that power is restored or other system failure is resolved, storage array controller 1002 (and/or MRAM controller 1006) may restore the initial copy of data, and/or any incremental updates to the unwritten data into SSDs 1050(1)-(*n*) (step 1114), and may return to step 1101, e.g., monitoring for a future power interruption or other system failure. Storage array controller 1002 (and/or MRAM controller 1006) may continue to capture incremental updates and store them to the SSDs 1050(1)-(*n*), based on time (e.g., at periodic intervals), based on exceeding log capacity, based on exceeding a high mark or threshold, or in response to processing system requests.

Notably, reference herein to "one embodiment" or "an embodiment" means that a particular feature, structure, or characteristic described in connection with the embodiment may be included, employed and/or incorporated in one, some or all of the embodiments of the present inventions. As explained above, the usages or appearances of the phrase "in one embodiment" or "in another embodiment" in the specification are not referring to the same embodiment, nor are separate or alternative embodiments necessarily mutually exclusive of one or more other embodiments, nor limited to a single exclusive embodiment. The same applies to the term "implementation." The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Further, as indicated above, an embodiment or implementation described herein as "exemplary" is not to be construed as preferred or advantageous, for example, over other embodiments or implementations; rather, it is intended convey or indicate the embodiment or embodiments are example embodiment(s).

The terms "comprise," "include," "have" and any variations thereof (for example, "comprising," "including" and "having") are used synonymously to denote or describe non-exclusive inclusion. As such, a process, method, article and/or apparatus that uses such terms to, for example, describe a recipe, configuration and/or contents, does not include only those steps, structures and/or elements but may include other steps, structures and/or elements not expressly identified, listed or inherent to such process, method, article or apparatus.

Further, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item.

The present disclosure is drawn to, among other things, a method of managing a memory device. In some aspects the method includes receiving data to be stored in a storage memory, wherein the storage memory is coupled to the memory device, wherein the memory device includes a first memory type and a second memory type different from the first memory type; storing a first copy of the received data in the first memory type; storing a second copy of the received data in the second memory type; receiving indication of a power loss to the memory device; in response to receiving indication of the power loss to the memory device, copying the second copy from the second memory type to the storage memory; detecting for power restoration to the memory device after the power loss; and in response to detecting power restoration to the memory device, restoring data to the first memory type by copying data from the second memory type to the first memory type.

In various aspects, the described method may include one or more of the following features: receiving first incremental data to be stored in the storage memory; storing a first copy of the first incremental data in the first memory type of the memory device; storing a second copy of the first incremental data in the second memory type of the memory device; receiving another indication of a power loss to the memory device; in response to receiving indication of the another power loss to the memory device, copying the second copy of the first incremental data stored from the second memory type to the storage memory; detecting for power restoration to the memory device after the power loss; and in response to detecting power restoration to the memory device, restoring the data to the first memory type by copying the first incremental data from the second memory type to the first memory type; the first memory type of the memory device is coupled to a back-up power supply; the first memory type is a volatile memory; the second memory type is a non-volatile memory; and the storage memory includes one or more of an SSD, HDD, and/or NAND flash device.

In another aspect, the present disclosure is drawn to, among other things, a memory device. In some aspects the memory device includes a first memory type, wherein the first memory type is configured to store a first copy of data received for storage in a storage memory, wherein the memory device is coupled to the storage memory; a second memory type different from the first memory type, wherein the second memory type is configured to store a second copy of the data received for storage in the storage memory; and a memory controller, wherein the memory controller is configured to (i) detect a power loss to the memory device, wherein, when the memory controller detects a power loss to the memory device, the memory controller copies the second copy of the data from the second memory type to the storage memory and (ii) detect a power restoration to the memory device, wherein, when the memory controller detects a power restoration to the memory device, the memory controller copies the second copy of the data from the second memory type to the first memory type.

In various aspects, the described memory device may include one or more of the following features: the first memory type is further configured to store a first copy of incremental data received for storage in the storage memory; the second memory type is further configured to store a second copy of the incremental data received for storage in the storage memory; and the memory controller is further configured to (i) copy the second copy of the incremental data from the second memory type to the storage memory when detecting a subsequent power loss to the memory device and (ii) copy the second copy of the incremental data from the second memory type to the first memory type when detecting a subsequent power restoration to the memory device; the first memory type of the memory device is coupled to a back-up power supply; the first memory type is a volatile memory; the second memory type is a non-volatile memory; and the storage memory includes one or more of an SSD, HDD, and/or NAND flash device.

In another aspect, the present disclosure is drawn to, among other things, a computing system. In some aspects the computing system includes a storage memory; a system controller, wherein the system controller is coupled to the storage memory via an interface; and a memory device, wherein the memory device comprises: a first memory type, wherein the first memory type is configured to store a first copy of data received for storage in the storage memory; a second memory type different from the first memory type, wherein the second memory type is configured to store a second copy of the data received for storage in the storage memory; and a memory controller, wherein the memory controller is configured to (i) detect a power loss to the memory device, wherein, when the memory controller detects a power loss to the memory device, the memory controller copies the second copy of the data from the second memory type to the storage memory and (ii) detect a power restoration to the memory device, wherein, when the memory controller detects the power restoration to the memory device, the memory controller copies the second copy of the data from the second memory type to the first memory type.

In various aspects, the computing system may include one or more of the following features: the first memory type of the memory device is coupled to a back-up power supply; the first memory type is a volatile memory; the second memory type is a non-volatile memory; the storage memory includes one or more of an SSD, HDD, and/or NAND flash device; the interface is one of a PCIe, SATA, or SAS physical interface; and the system controller is configured to operate in one of an NVDIMM-P, NVMe, or AHCI command protocol.

The foregoing description of the inventions has been described for purposes of clarity and understanding. It is not intended to limit the inventions to the precise form disclosed. Various modifications may be possible within the scope and equivalence of the application.

We claim:

1. A method of managing a memory device, comprising:
receiving data to be stored in a storage memory, wherein the received data is segregated between critical data and non-critical data, wherein the storage memory is coupled to the memory device via a bus within a computing system, wherein the memory device includes a first memory type and a second memory type, wherein the first memory type is a volatile memory, the second memory type is a non-volatile memory, and the storage memory is another non-volatile memory, wherein the second memory type is configured with a storage capacity of a first size, wherein the first size of the storage capacity is inversely proportional to a size of a back-up power supply of the memory device, and wherein a relative apportionment between critical and non-critical data is defined in registers of the memory device;
storing a copy of the data in the first memory type;
determining a current or potential power loss to the memory device;
in response to determining the current or potential power loss, storing unwritten data, which is intended for the storage memory, from the first memory type to the second memory type and committing the unwritten data from the second memory type to the storage memory;
determining that the current or potential power loss has been resolved; and in response to determining that the current or potential power loss has been resolved, copying the unwritten data from the second memory type to the first memory type.

2. The method of claim 1, further comprising:
after determining the current or potential power loss to the memory device:
receiving first incremental data to be stored in the storage memory, wherein the first incremental data is segregated between critical incremental data and non-critical incremental data;
storing a copy of the first incremental data in the first memory type of the memory device; and
storing a backup copy of the critical incremental data in the second memory type; and
receiving indication of a subsequent power loss to the memory device;
in response to receiving indication of the subsequent power loss, copying the backup copy of the critical incremental data stored in the second memory type to the storage memory;
detecting for power restoration to the memory device after the subsequent power loss; and
in response to detecting power restoration to the memory device, copying the backup copy of the critical incremental data from the second memory type to the first memory type.

3. The method of claim 1, wherein the storage memory includes one or more of an SSD, HDD, and/or NAND flash device.

4. A memory device, comprising:
a first memory type, wherein the first memory type is configured to store a first copy of data received for storage in a storage memory, wherein the first memory type is a volatile memory and the storage memory is a non-volatile memory, wherein the memory device is coupled to the storage memory via a bus within a computing system, wherein the data received for storage is segregated between critical data and non-critical data, and wherein a relative apportionment between the critical and non-critical data is defined in registers of the memory device;
a second memory type, wherein the second memory type is another non-volatile memory and is configured with a storage capacity of a first size, wherein the first size of the storage capacity is inversely proportional to a size of a back-up power supply of the memory device; and
a memory controller, wherein the memory controller is configured to (i) determine a current or potential power loss to the memory device, wherein, when the memory controller determines the current or potential power loss, the memory controller copies the unwritten data, which is intended for the storage memory, from the first memory type to the second memory type and commits the unwritten data from the second memory type to the storage memory, and (ii) determine that the current or potential power loss has been resolved, wherein, when the memory controller determines that the current or potential power loss has been resolved, the memory controller copies the unwritten data from the second memory type to the first memory type.

5. The memory device of claim 4, wherein:
the first memory type is further configured to store a copy of incremental data received for storage in the storage memory, wherein the incremental data received for storage is segregated between critical incremental data and non-critical incremental data;
the second memory type is further configured to store a backup copy of the critical incremental data; and
the memory controller is further configured to (i) copy the critical incremental data from the first memory type to the second memory type as the backup copy of the critical incremental data upon the current or potential power loss, (ii) copy the backup copy of the critical incremental data stored in the second memory type to the storage memory upon a subsequent power loss to the memory device, and (ii) copy the backup copy of the critical incremental data from the second memory type to the first memory type upon power restoration to the memory device after the subsequent power loss.

6. The memory device of claim 4, wherein the storage memory includes one or more of an SSD, HDD, and/or NAND flash device.

7. A computing system, comprising:
a storage memory, wherein the storage memory is a non-volatile memory;
a system controller, wherein the system controller is coupled to the storage memory via an interface; and
a memory device coupled to the storage memory via a bus within the computing system, wherein the memory device comprises:
a first memory type, wherein the first memory type is configured to store a first copy of data received for storage in the storage memory, wherein the first memory type is a volatile memory, wherein the data received for storage is segregated between critical data and non-critical data, and wherein a relative apportionment between the critical and non-critical data is defined in registers of the memory device;
a second memory type, wherein the second memory type is another non-volatile memory and is configured with a storage capacity of a first size, wherein the first size of the storage capacity is inversely proportional to a size of a back-up power supply of the memory device; and
a memory controller, wherein the memory controller is configured to (i) determine a current or potential power loss to the memory device, wherein, when the memory controller determines the current or potential power loss, the memory controller copies the unwritten data, which is intended for the storage memory, from the first memory type to the second memory type and commits the unwritten data from the second memory type to the storage memory, and (ii) determine that the current or potential power loss has been resolved, wherein, when the memory controller determines that the current or potential power loss has been resolved, the memory controller copies the unwritten data from the second memory type to the first memory type.

8. The computing system of claim 7, wherein:
the first memory type is further configured to store a copy of incremental data received for storage in the storage memory, wherein the incremental data received for storage is segregated between critical incremental data and non-critical incremental data;
the second memory type is further configured to store a backup copy of the critical incremental data; and
the memory controller is further configured to (i) copy the critical incremental data from the first memory type to the second memory type as the backup copy of the critical incremental data upon the current or potential power loss, (ii) copy the backup copy of the critical incremental data stored in the second memory type to the storage memory upon a subsequent power loss to the memory device, and (ii) copy the backup copy of the critical incremental data from the second memory type to the first memory type upon power restoration to the memory device after the subsequent power loss.

9. The computing system of claim 7, wherein the storage memory includes one or more of an SSD, HDD, and/or NAND flash device.

10. The computing system of claim 7, wherein the interface is one of a PCIe, SATA, or SAS physical interface.

11. The computing system of claim 7, wherein the system controller is configured to operate in one of an NVDIMM-P, NVMe, or AHCI command protocol.

12. The method of claim 1, wherein the back-up power supply of the memory device is one of a battery pack and a supercapacitor.

13. The memory device of claim 4, wherein the back-up power supply of the memory device is one of a battery pack and a supercapacitor.

14. The computing system of claim 7, wherein the back-up power supply of the memory device is one of a battery pack and a supercapacitor.

15. The method of claim 1, wherein the second memory type is a magnetoresistive device.

16. The memory device of claim 4, wherein the second memory type is a magnetoresistive device.

17. The computing system of claim 7, wherein the second memory type is a magnetoresistive device.

* * * * *